(12) United States Patent
Lu et al.

(10) Patent No.: US 7,902,765 B2
(45) Date of Patent: Mar. 8, 2011

(54) CIRCUIT SYSTEM FOR DRIVING HIGH-INTENSITY DISCHARGING LAMP

(75) Inventors: Hung-Ching Lu, Taipei (TW); Te-Lung Shih, Taipei (TW)

(73) Assignees: Tatung University, Taipei (TW); Tatung Company, Taipei (TW)

( * ) Notice: Subject to any disclaimer, the term of this patent is extended or adjusted under 35 U.S.C. 154(b) by 426 days.

(21) Appl. No.: 12/149,860

(22) Filed: May 9, 2008

(65) Prior Publication Data
US 2009/0184651 A1    Jul. 23, 2009

(30) Foreign Application Priority Data

Jan. 21, 2008    (TW) ................................ 97102197 A

(51) Int. Cl.
*H05B 37/02* (2006.01)
(52) U.S. Cl. .......... 315/224; 315/220; 315/282; 315/291
(58) Field of Classification Search .............. 315/209 R, 315/219, 220, 224, 246, 247, 274, 276, 282, 315/287, 291; 323/282; 363/56.01, 89
See application file for complete search history.

(56) References Cited

U.S. PATENT DOCUMENTS

| | | | | |
|---|---|---|---|---|
| 5,422,545 A | * | 6/1995 | Felper et al. | 315/209 R |
| 5,453,665 A | * | 9/1995 | Konopka | 315/219 |
| 5,654,611 A | * | 8/1997 | Yamamoto et al. | 315/308 |
| 6,784,622 B2 | * | 8/2004 | Newman et al. | 315/219 |
| 7,541,791 B2 | * | 6/2009 | Quazi | 323/282 |
| 2002/0109468 A1 | * | 8/2002 | Takeda et al. | 315/291 |
| 2003/0102818 A1 | * | 6/2003 | Shen | 315/291 |
| 2005/0093477 A1 | * | 5/2005 | Shi | 315/224 |

* cited by examiner

*Primary Examiner* — Douglas W Owens
*Assistant Examiner* — Tung X Le
(74) *Attorney, Agent, or Firm* — Bacon & Thomas, PLLC

(57) ABSTRACT

The invention provides a circuit system for driving a high-intensity discharging lamp, comprising a boosting circuit, an ignition coil circuit and a clamp circuit. The boosting circuit includes a first transformer and a first switch, in which the primary of the first transformer receives an input power, the secondary of the first transformer produces a boosting DC voltage, and the first switch is connected to the first transformer to control turning-on and turning-off of the first transformer. The ignition coil circuit is connected to the boosting circuit for converting the boosting DC voltage into a switching AC voltage to drive a load. The clamp circuit is connected to the boosting circuit and the ignition coil circuit for directing energy, reflected from the secondary of the first transformer to the primary of the first transformer, to the secondary of the first transformer as the first switch is turned off.

9 Claims, 6 Drawing Sheets

CIRCUIT SYSTEM FOR DRIVING HIGH-INTENSITY DISCHARGING LAMP

BACKGROUND OF THE INVENTION

1. Field of the Invention

The invention relates to the technical field of voltage conversion, particularly to a circuit system for driving a high-intensity discharging lamp.

2. Background of the Invention

In the past, the lamp set of a vehicle is comprised of traditional tungsten filament lamps. In 1992, Philips Company promoted a high-intensity discharging lamp (HID), which changed the illumination history of the human being. The high-intensity discharging lamp (HID) is mainly a xenon lamp set or a gas discharging lamp set. As compared with the traditional lamps, the HID lamp has the advantages of high intensity, high color temperature and stability in beam pattern. The enhancement of the intensity indicates a wider visible range when driving a vehicle in night, the high color temperature indicates more real color of the viewing object and the stability of beam pattern represents a fixed illumination range such that the driver does not need to worry about instant moving of the illumination range of the head lamps.

In the traditional lamp, the light is produced by heating the tungsten filament when flowing the current therein. In the HID discharging lamp, a DC voltage is boosted and converted into a switching AC voltage of 23,000 volts through a drive circuit system, rendering liberation of electrons of the xenon gas in a crystal glass lamp after high voltage oscillation and producing a light source for illuminating intensive arc between two electrodes, and then, the drive circuit system will lower the operating voltage to 80-110 volts after smooth activation.

FIG. 1 shows a drive circuit system 100 for a conventional HID lamp. The drive circuit system 100 in FIG. 1 uses a flyback converter. As switch S1 is turned on, the voltage of terminal A is in a low potential and energy is stored in transformer T1. As the switch S1 is turned off, the energy stored in the transformer T1 is released in a form of current at the secondary of the transformer T1. The voltage induced at the secondary of the transformer T1 is reflected to the primary of the transformer T1. If the winding ratio between the primary of the transformer T1 and the secondary of the transformer T1 is N1/N2=n and the voltage of the secondary of the transformer T1 is Vo, due to reflection of the voltage of the secondary, Va, the voltage at terminal A, becomes as follows: Va=Vin−(−nVo)=Vin+nVo. FIG. 2 is a schematic diagram the voltage of a conventional drive circuit system 100. As shown in the drawing, the voltage at terminal A is not merely Vin+nVo. Meanwhile, due to equivalent inductance of the transformer T1, a spark will occur at the terminal A, as shown in the circle of FIG. 2, which will result in exhausting of the energy and cause damage to the switch S1. Aiming at the reflection phenomenon of the voltage at the secondary of the transformer T1, the conventional technique adopts a switch having higher withstanding voltage. However, it will increase more costs. Another approach is to use a clamp circuit to clamp the voltage reflected from the secondary of the transformer T1 so as to protect the switch S1. However, it will result in lowering conversion efficiency of the transformer T1. Therefore, it is desirable to provide an improved circuit system for driving a high-intensity discharging lamp to mitigate and/or obviate the aforementioned problems.

BRIEF SUMMARY OF THE INVENTION

An objective of the invention is to provide a circuit system for driving a high-intensity discharging lamp so as to solve the problem regarding the reflection voltage of the secondary of the transformer in a conventional circuit system for driving a high-intensity discharging lamp.

Further an objective of the invention is to provide a circuit system for driving a high-intensity discharging lamp so as to avoid increasing the cost in a conventional circuit system for driving a high-intensity discharging lamp and to overcome the problem of lowering of the conversion efficiency encountered in the conventional techniques.

To accomplish the above objectives, the invention provides a circuit system for driving a high-intensity discharging lamp (HID), comprising a boosting circuit, an ignition coil circuit and a clamp circuit. The boosting circuit includes a first transformer and a first switch, in which the primary of the first transformer receives an input power, the secondary of the first transformer produces a boosting DC voltage, and the first switch is connected to the first transformer to control turning-on and turning-off of the first transformer. The ignition coil circuit is connected to the boosting circuit for converting the boosting DC voltage into a switching AC voltage to drive a load. The clamp circuit is connected to the boosting circuit and the ignition coil circuit for directing energy, reflected from the secondary of the first transformer to the primary of the first transformer, to the secondary of the first transformer as the first switch is turned off.

DETAILED DESCRIPTION OF THE INVENTION

The implementation of the invention will be explained by the particular embodiments as described below such that people having common knowledge in the art will easily understand the advantages and effects of the invention according to the disclosure thereof.

Figure 1:
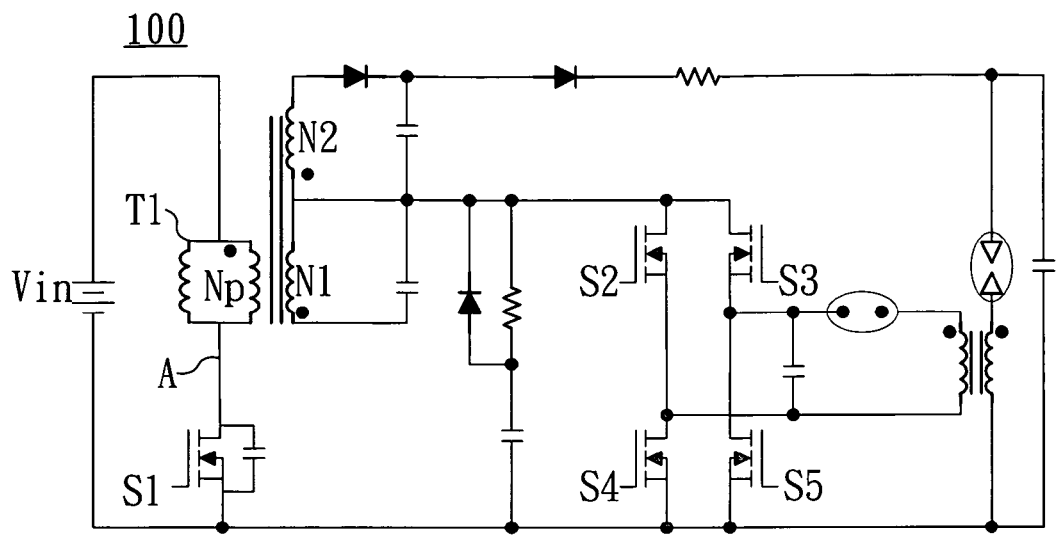
FIG. 1 shows a circuit diagram of a drive circuit system for a conventional HID lamp.
Figure 2:
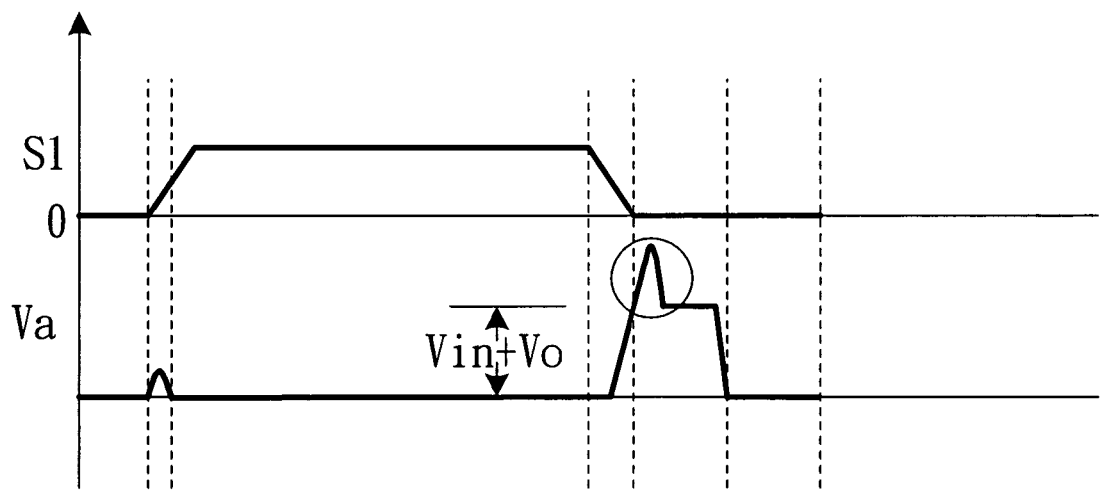
FIG. 2 is a schematic diagram showing the voltage in a conventional drive circuit system.
Figure 3:
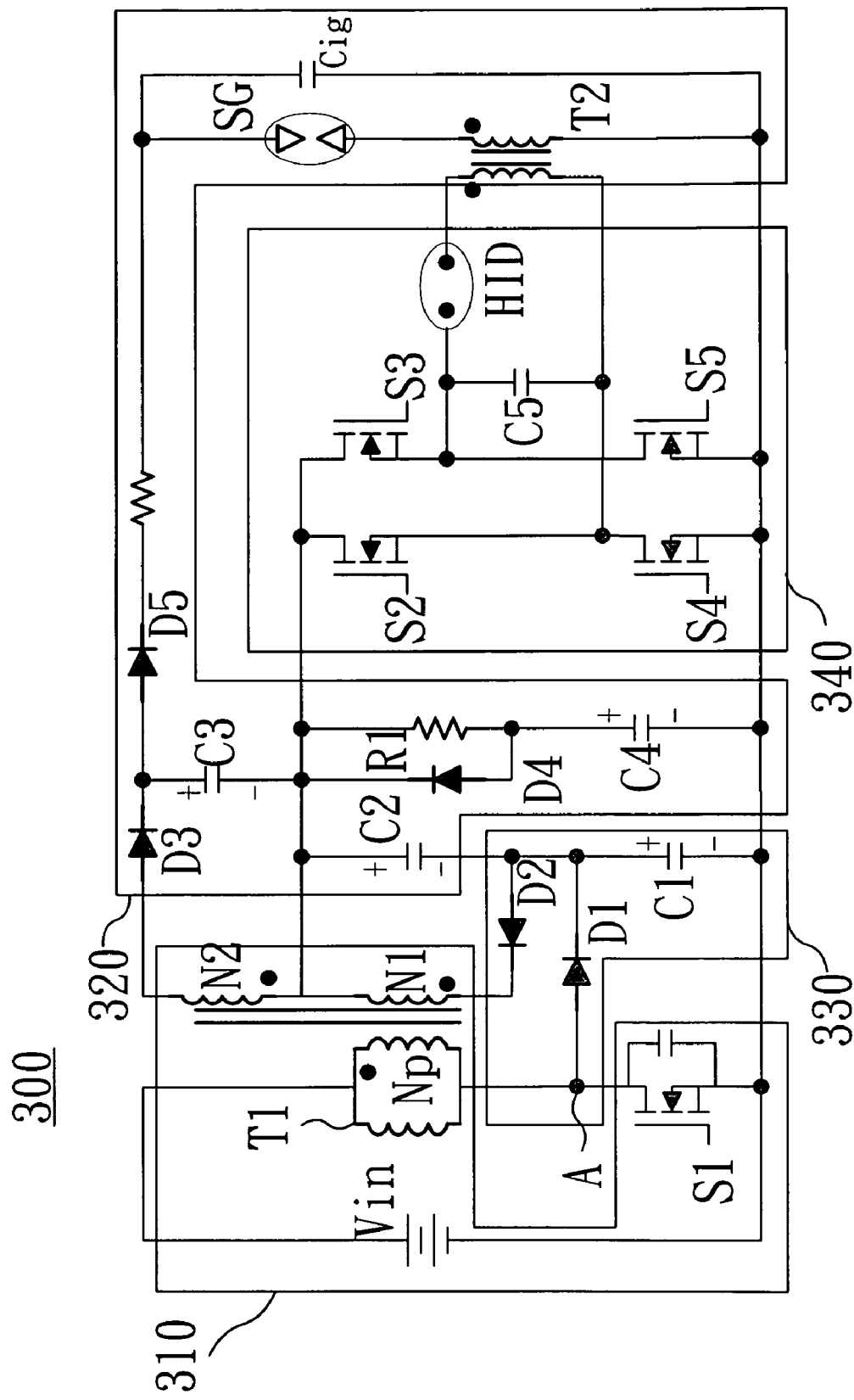
FIG. 3 is a circuit diagram showing a circuit system for driving a high-intensity discharging lamp according to the invention.

FIG. 3 is a circuit diagram showing a circuit system 300 for driving a high-intensity discharging lamp (HID) according to the invention. The circuit system 300 comprises a boosting circuit 310, an ignition coil circuit 320 and a clamp circuit 330.

The boosting circuit 310 includes a first transformer T1 and a first switch S1, in which the primary winding (hereinafter abbreviated as primary) of the first transformer T1 receives an input power Vin and the secondary of the first transformer T1 produces a boosting DC voltage. The first switch S1 is connected to the first transformer T1 to control turning-on and turning-off of the first transformer T1.

The ignition coil circuit 320 is connected to the boosting circuit 310 for converting the boosting DC voltage into a switching AC voltage to drive a load 340.

The clamp circuit 330 is connected to the boosting circuit 310 and the ignition coil circuit 320 for directing energy, reflected from the secondary winding (hereinafter abbreviated as secondary) of the first transformer T1 to the primary of the first transformer T1, to the secondary of the first transformer as the first switch S1 is turned off.

The clamp circuit 330 is a current gain circuit and includes a first diode D1, a second diode D2 and a first capacitor C1. The positive terminal of the first diode D1 is connected to the first switch S1 and the primary of the first transformer T1. The negative terminal of the first diode D1 is connected to the positive terminal of the first capacitor C1 and the negative terminal of the first capacitor C1 is connected to a low potential.

The positive terminal of the second diode D2 is connected to the negative terminal of the first diode D1 and the positive terminal of the first capacitor C1, and the negative terminal of the second diode D2 is connected to the secondary of the first transformer T1.

The ignition coil circuit 320 is connected to the secondary of the first transformer T1 and includes a third diode D3, a fourth diode D4, a fifth diode D5, a second capacitor C2, a third capacitor C3, a fourth capacitor C4, a first resistor R1, a second transformer T2 and a spark gap device SG so as to convert the boosting DC voltage into the switching AC voltage.

The positive terminal of the third diode D3 is connected to the secondary of the first transformer T1 and the negative terminal of the third diode D3 is connected to the positive terminal of the third capacitor C3 and the positive terminal of the fifth diode D5.

The negative terminal of the third capacitor C3 is connected to the positive terminal of the second capacitor C2, the middle portion of the secondary of the first transformer T1, the negative terminal of the fourth diode D4 and a terminal of the first resistor R1.

The positive terminal of the fourth diode D4 is connected to the other terminal of the first resistor R1 and the positive terminal of the fourth capacitor C4, and the negative terminal of the fourth capacitor C4 is connected to the low potential. The negative terminal of the second capacitor C2 is connected to the positive terminal of the second diode D2, the negative terminal of the first diode D1 and the positive terminal of the first capacitor C1. The negative terminal of the fifth diode D5 is connected to a terminal of the spark gap device SQ and the other terminal of the spark gap device SG is connected to the primary of the second transformer T2. Cig is an energy storing capacitor and provided in parallel with the spark gap device SG.

The load 340 is comprised of a high-intensity discharging lamp HID, a second switch S2, a third switch S3, a fourth switch S4, a fifth switch S5 and a loading capacitor C5.

One terminal of the high-intensity discharging lamp HID is connected to the secondary of the second transformer T2 and the other terminal of the high-intensity discharging lamp is connected to one terminal of the loading capacitor C5, one terminal of the third switch S3 and one terminal of the fifth switch S5.

One terminal of the second switch S2 is connected to the negative terminal of the third capacitor C3 and the positive terminal of the second capacitor C2. The other terminal of the second switch S2 is connected to one terminal of the fourth switch S4. The other terminal of the fourth switch S4 is connected to the low potential. The other terminal of the fifth switch S5 is connected to the low potential.

Figure 4:
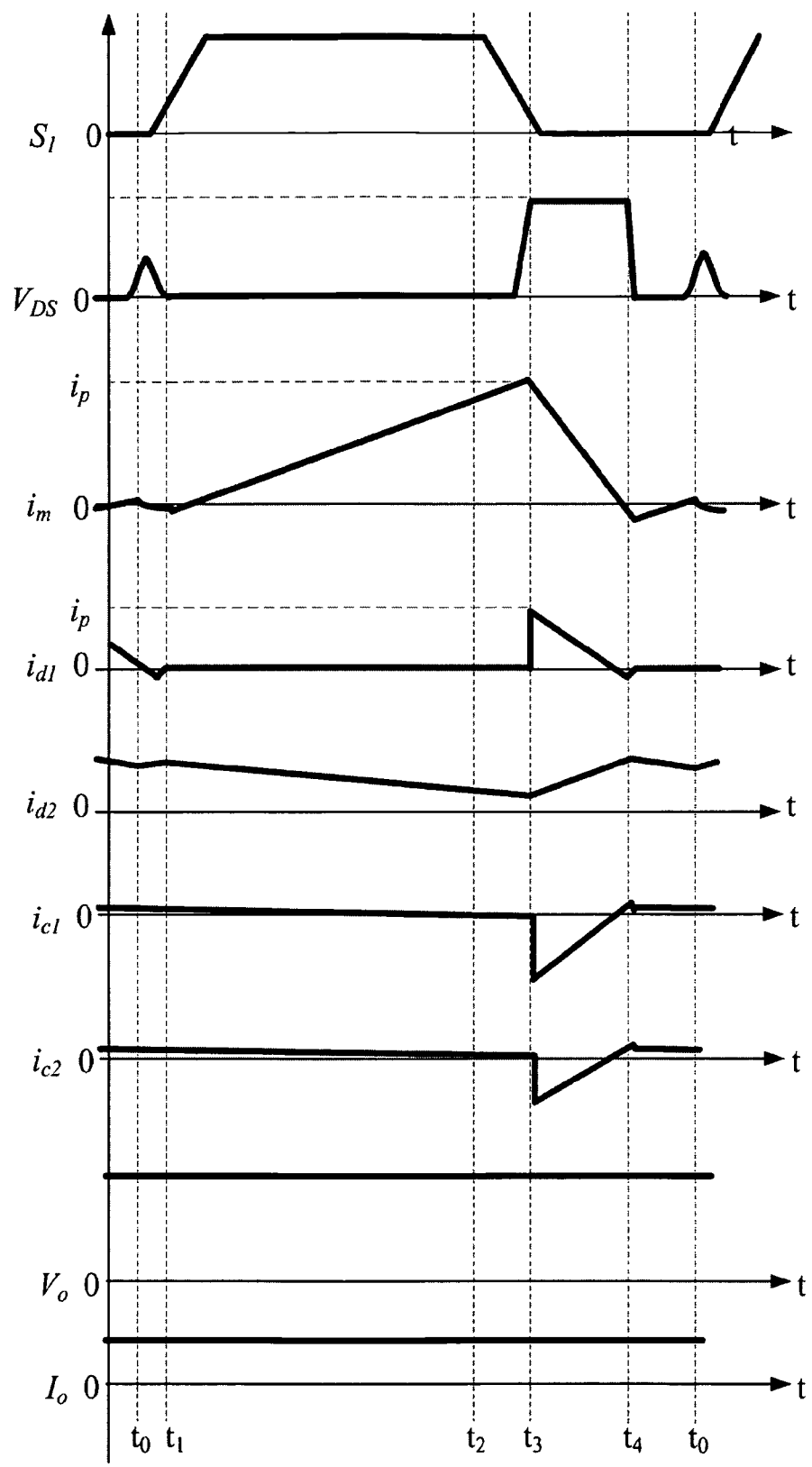
FIG. 4 shows wave-shape of the circuit system for driving the high-intensity discharging lamp according to the invention.
Figure 5:
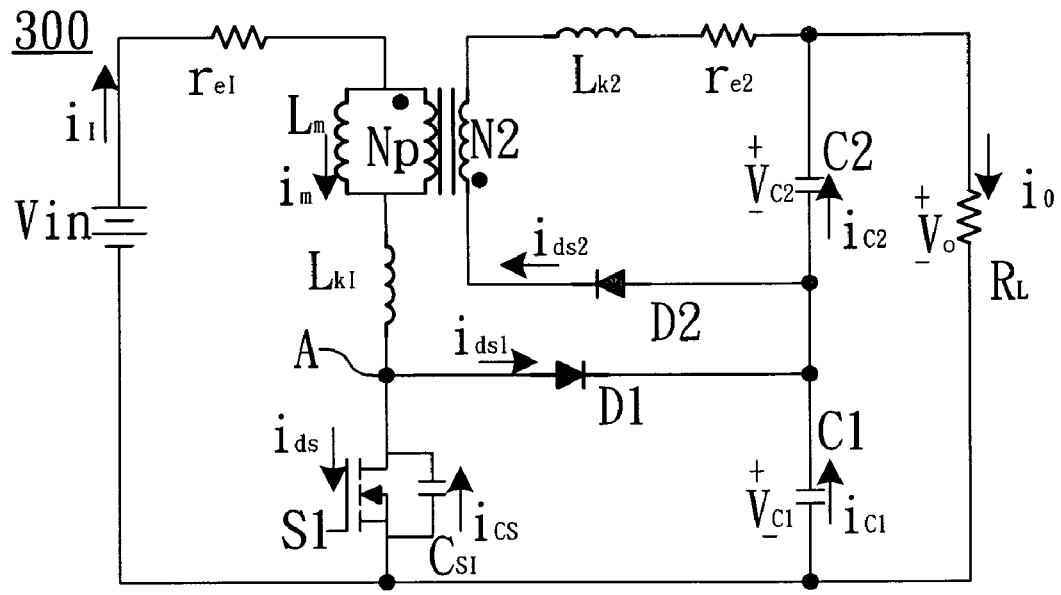
FIG. 5 is an equivalent circuit diagram of the circuit system for driving the high-intensity discharging lamp according to the invention.

FIG. 4 shows wave-shape of the circuit system 300 for driving the high-intensity discharging lamp according to the invention, in which the voltage at terminal A is $V_{DS}$. FIG. 5 is an equivalent circuit diagram of the circuit system 300 for driving the high-intensity discharging lamp according to the invention. As shown in FIG. 4, it is divided in mode 1 (t0-t1), mode 2 (t1-t2), mode 3 (t2-t3), mode 4 (t3-t4) and mode 5 (t4-t0).

Figure 6:
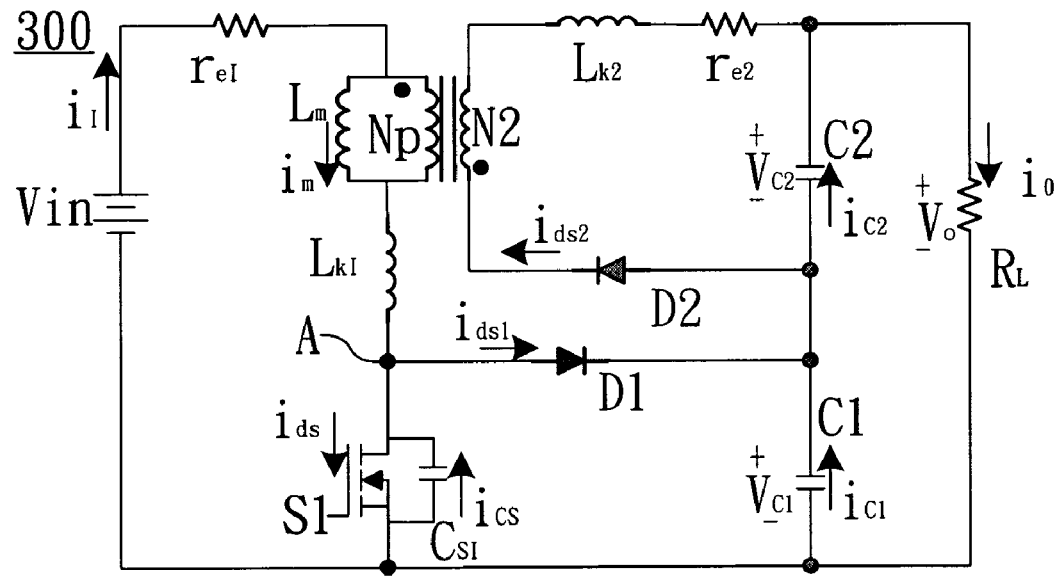
FIG. 6 is an equivalent circuit diagram of the invention in mode 1.

In the mode 1 (t0-t1), the switch S1 is turned on at time t0. In this period, parasitic capacitance $C_{SI}$ is resonating with leakage inductance $L_{KI}$ such that the energy of the transformer T1 still transfers to the secondary. In this period, the second diode D2 is forward-biased. The energy transferred to the secondary is forwarded to load $R_L$ through the first capacitor C1 and the second capacitor. Since $V_{DS}$, the voltage at the terminal A, is too small to allow the first diode D1 to conduct, the first diode D1 is presented in gray color, indicating that it is inoperative. FIG. 6 is an equivalent diagram for the mode 1 of the invention.

Figure 7:
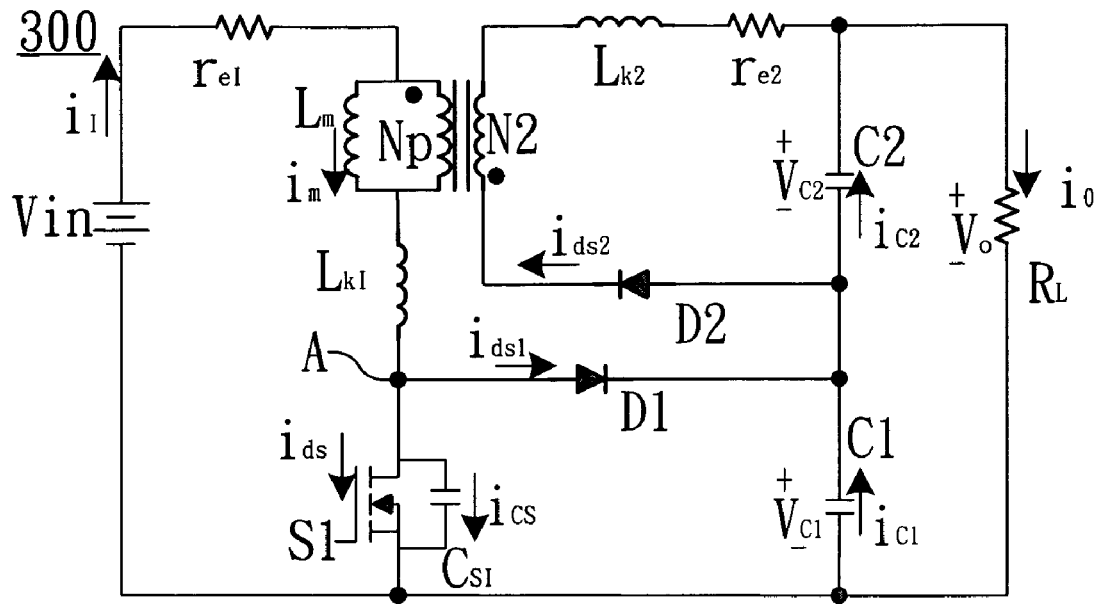
FIG. 7 is an equivalent circuit diagram of the invention in mode 2.

In the mode 2 (t1-t2), the first switch S1 is fully conducted. The second diode D2 is still forward-biased and conducted. In this period, the energy stored in the first capacitor C1, the second capacitor C2 and leakage inductor $L_{K2}$ is conducted to the load RL. At time t2, after the leakage inductor $L_{K2}$ completely releases the energy to the load RL, the second diode D2 begins to become reversed-biased. FIG. 7 is an equivalent diagram for the mode 2 of the invention.

Figure 8:
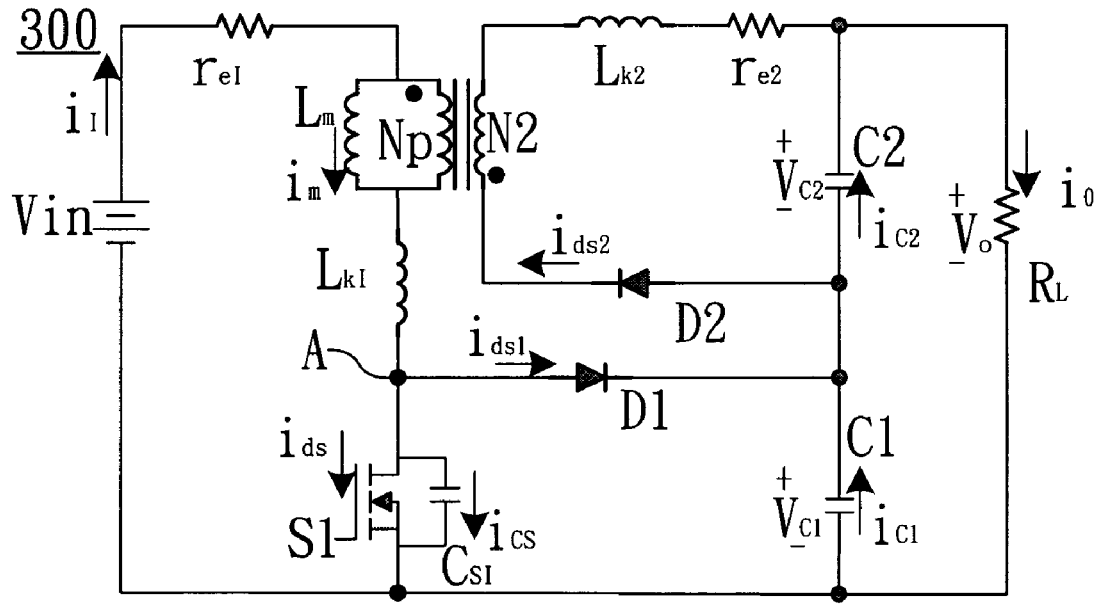
FIG. 8 is an equivalent circuit diagram of the invention in mode 3.

In the mode 3 (t2-t3), the first switch S1 starts to be turned off. The second diode D2 is still forward-biased and the first diode D1 is reversed-biased. In this period, the energy stored in the first capacitor C1 and the second capacitor C2 is conducted to the load $R_L$. At tome t3, magnetizing current $i_m$ reaches maximum value $i_p$ and the first switch S1 is completely turned off. FIG. 8 is an equivalent diagram for the mode 3 of the invention.

Figure 9:
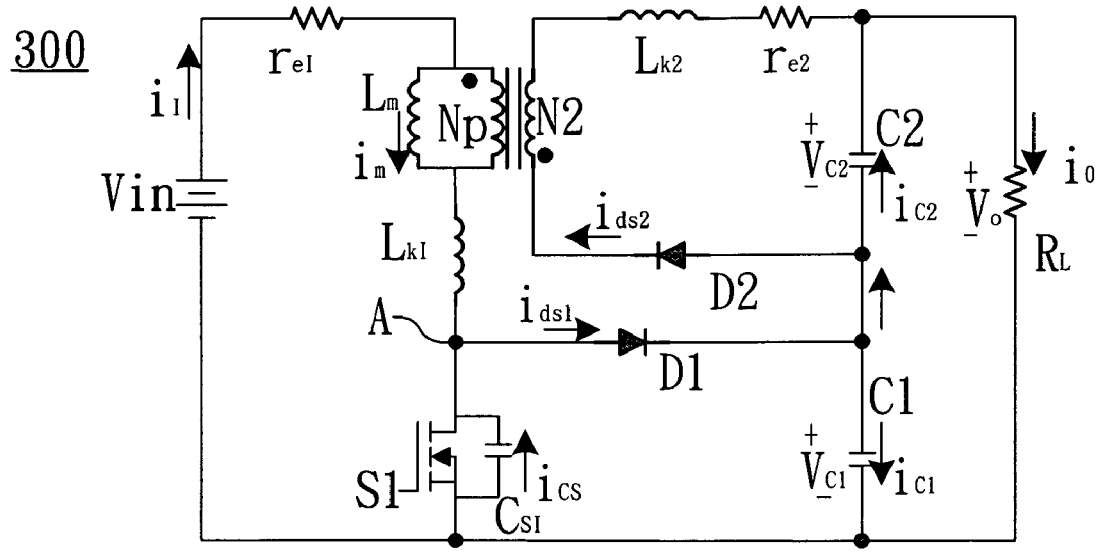
FIG. 9 is an equivalent circuit diagram of the invention in mode 4.

In the mode 4 (t3-t4), the first switch S1 is turned off. The magnetizing current $i_m$ charges the parasitic capacitor $C_{SI}$ of the first switch S1. At the time t4, since the voltage of the parasitic capacitor $C_{SI}$ is greater than the voltage of the first capacitor C1 ($VC_{SI}>VC1$), the first diode D1 and the second diode D2 are forward-biased and conducted. FIG. 9 is an equivalent diagram for the mode 4 of the invention.

Figure 10:
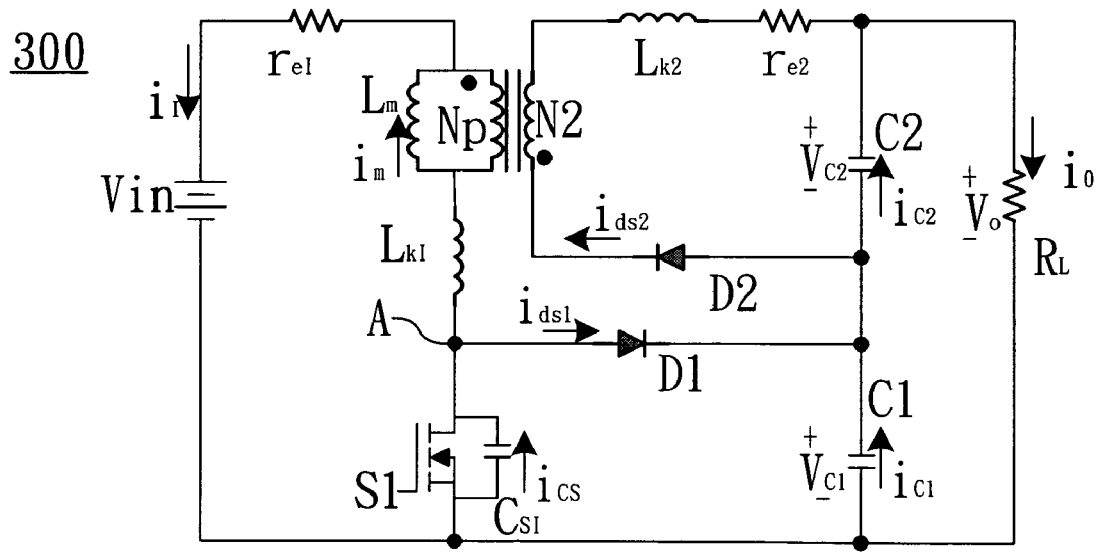
FIG. 10 is an equivalent circuit diagram of the invention in mode 5.

In the mode 5 (t4-t0), the magnetizing current $i_m$ is led to the secondary of the first transformer T1 via the clamp circuit 330. The first diode D1 is reversed-biased. And the first switch S1 is turned off. The energy of the first capacitor C1, the second capacitor C2 and the leakage inductor $L_{K2}$ is conducted to the load $R_L$. FIG. 10 is an equivalent diagram for the mode 5 of the invention.

In the conventional techniques, as the first switch S1 is turned off, the energy reflected from the secondary to the primary will raise the current at the node A and produce the spark phenomenon. It can be known from the schematic diagrams of FIGS. 4-10 that as the first switch S1 is turned off, the reaching of the magnetizing current $i_m$ to the maximum value $i_p$ will not produce the spark phenomenon, as incurred in the conventional techniques. Meanwhile, since the magnetizing current $i_m$ is led to the secondary of the first transformer T1 via the clamp circuit 330, the current at the node (magnetizing current $i_m$) is smaller than that of the conventional techniques.

As explained above, in the circuit system 300 for driving a high-intensity discharging lamp (HID) of the invention, since the magnetizing current $i_m$ is led to the secondary of the first transformer T1 via the clamp circuit 330, it is capable of efficiently making use of the energy reflected from the secondary to the primary, while reducing the voltage applied to the first switch S1. Therefore, the invention does not need to use a switch element having high voltage withstanding. The invention is capable of solving the problem of high cost, while overcoming the problem of low conversion efficiency incurred in the transformers of the conventional techniques.

The embodiments above are merely submitted to interpret the invention for the sake of convenience. What is claimed in the invention should be based on what is described in the claims, while not limited to the above embodiments.

What is claimed is:

1. A circuit system for driving a high-intensity discharging lamp, comprising:
    a boosting circuit, including a first transformer and a first switch, in which the first transformer has a primary winding for receiving an input power and a secondary winding for producing a boosting DC voltage, and the first switch is connected to the first transformer to control turning-on and turning-off of the first transformer;
    an ignition coil circuit, connected to the boosting circuit for converting the boosting DC voltage into a switching AC voltage to drive a load; and
    a clamp circuit, connected to the boosting circuit and the ignition coil circuit for directing energy, reflected from the secondary winding of the first transformer to the primary winding of the first transformer, to the secondary winding of the first transformer as the first switch is turned off,
    wherein the clamp circuit is a current gain circuit which is comprised of a first diode, a second diode and a first capacitor; the positive terminal of the first diode is connected to the first switch and the primary of the first transformer; the negative terminal of the first diode is connected to the positive terminal of the first capacitor and the negative terminal of the first capacitor is connected to a low potential; the positive terminal of the second diode is connected to the negative terminal of the first diode and the positive terminal of the first capacitor, and the negative terminal of the second diode is connected to the secondary of the first transformer.

2. The circuit system as claimed in claim 1, wherein the ignition coil circuit is connected to the secondary winding of the first transformer and includes a third diode, a fourth diode, a fifth diode, a second capacitor, a third capacitor, a fourth capacitor, a first resistor, a second transformer and a spark gap device so as to convert the boosting DC voltage into the switching AC voltage.

3. The circuit system as claimed in claim 2, wherein the positive terminal of the third diode is connected to the secondary winding of the first transformer and the negative terminal of the third diode is connected to the positive terminal of the third capacitor and the positive terminal of the fifth diode.

4. The circuit system as claimed in claim 2, wherein the negative terminal of the third capacitor is connected to the positive terminal of the second capacitor, the middle portion of the secondary winding of the first transformer, the negative terminal of the fourth diode and a terminal of the first resistor.

5. The circuit system as claimed in claim 4, wherein the positive terminal of the fourth diode is connected to the other terminal of the first resistor and the positive terminal of the fourth capacitor, and the negative terminal of the fourth capacitor is connected to the low potential.

6. The circuit system as claimed in claim 5, wherein the negative terminal of the second capacitor is connected to the positive terminal of the second diode, the negative terminal of the first diode and the positive terminal of the first capacitor.

7. The circuit system as claimed in claim 6, wherein the negative terminal of the fifth diode is connected to a terminal of the spark gap device, and the other terminal of the spark gap device is connected to the primary winding of the second transformer.

8. The circuit system as claimed in claim 1, wherein the load is comprised of a high-intensity discharging lamp, a second switch, a third switch, a fourth switch, a fifth switch and a loading capacitor.

9. The circuit system as claimed in claim 8, wherein one terminal of the high-intensity discharging lamp is connected to the secondary winding of the second transformer and the other terminal of the high-intensity discharging lamp is connected to one terminal of the loading capacitor, one terminal of the third switch and one terminal of the fifth switch.

* * * * *